United States Patent [19]

Hazra et al.

[11] 4,359,300

[45] Nov. 16, 1982

[54] CUTTING INSERT WITH IMPROVED CHIP CONTROL

[75] Inventors: Jayanta Hazra, Troy; Sazzadul Haque, Pontiac, both of Mich.

[73] Assignee: General Electric Co., Detroit, Mich.

[21] Appl. No.: 221,006

[22] Filed: Dec. 29, 1980

[51] Int. Cl.³ .............................................. B26D 1/00
[52] U.S. Cl. ..................................................... 407/114
[58] Field of Search ............................... 407/114, 115

[56] References Cited

U.S. PATENT DOCUMENTS

| | | | |
|---|---|---|---|
| 3,395,434 | 8/1968 | Wirfelt | 407/114 |
| 3,407,467 | 10/1968 | Wirfelt | 407/114 |
| 3,885,281 | 6/1974 | Stambler | 407/114 |
| 3,968,550 | 7/1976 | Gehri | 407/114 |
| 4,056,872 | 11/1977 | Seidel | 407/114 |
| 4,189,265 | 2/1980 | Arnold et al. | 407/114 |
| 4,288,179 | 9/1981 | Kruger et al. | 407/114 |
| 4,318,644 | 3/1982 | Seidel | 407/114 |

FOREIGN PATENT DOCUMENTS 2231631 2/1973 Fed. Rep. of Germany .

Primary Examiner—Leonidas Vlachos
Assistant Examiner—Jerry Kearns
Attorney, Agent, or Firm—Hedman, Casella, Gibson & Costigan

[57] ABSTRACT

A cutting insert for use with an indexable cutting tool is formed from a flat wafer of cutting material which is generally polygonal in plane form and includes a pair of opposed faces and a plurality of upstanding side walls extending therebetween. The juncture of the side walls with each face defines the cutting edges of the insert. The polygonal insert which includes a plurality or radiused corner portions, is provided with at least one nonplanar insert face wherein the corner portions thereof slope inwardly towards the opposed face of the insert. Each corner portion further includes a pair of generally triangular chip grooves separated by a raised central triangular land area. Each chip groove is spaced from the peripheral cutting edge of the insert to define side land areas which increase in width from the corner portion to their opposed ends. The chip grooves increase in both width and depth from the corner portions to their opposed ends. The unique chip groove arrangement functions to reduce the forces imposed on the insert and enables the insert to be utilized over a wide range of feed rates and at various cuttng depths and chip loads, while simultaneously increasing the life of the insert.

10 Claims, 5 Drawing Figures

U.S. Patent  Nov. 16, 1982  4,359,300
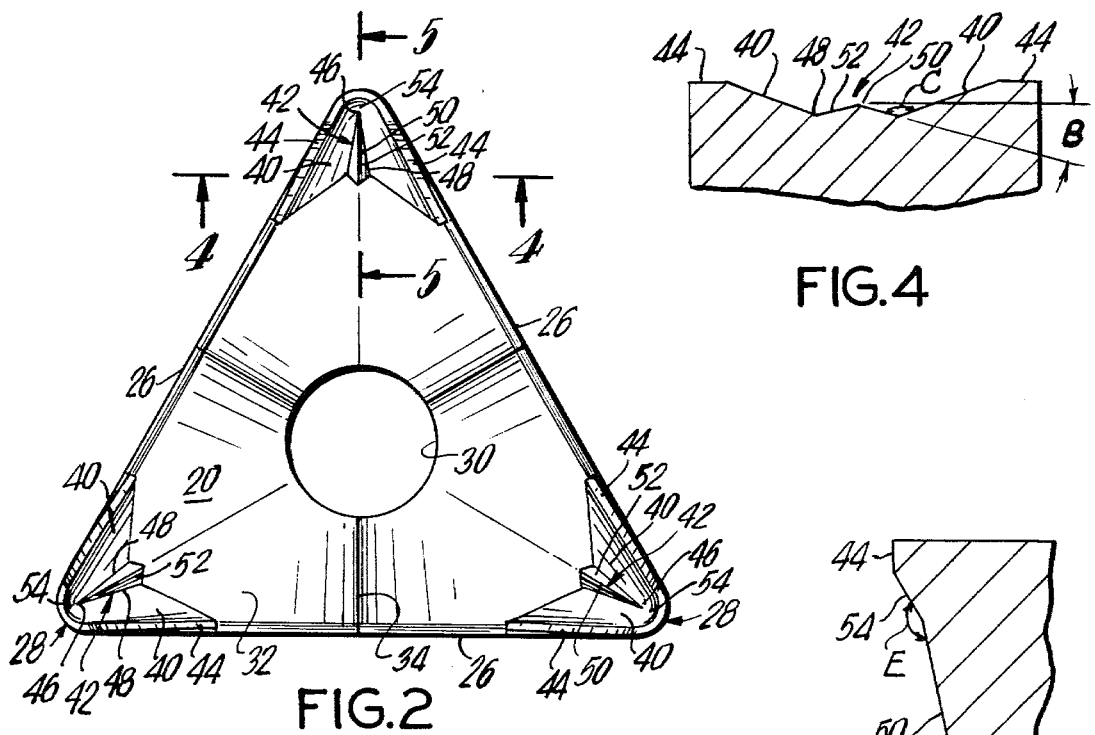
FIG.1
FIG.2
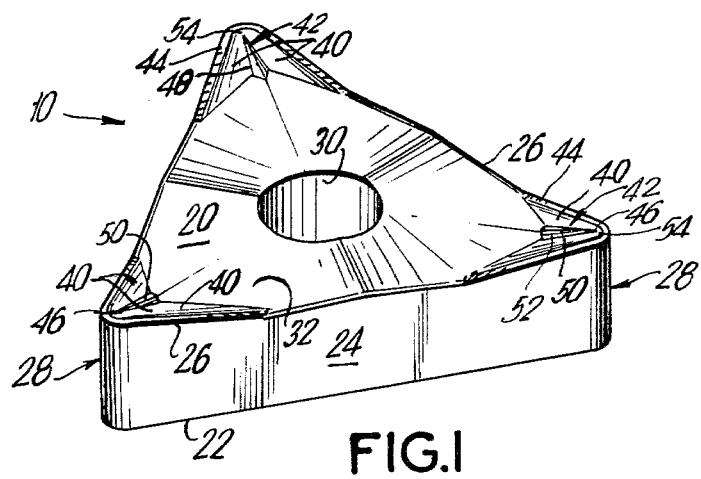
FIG.4
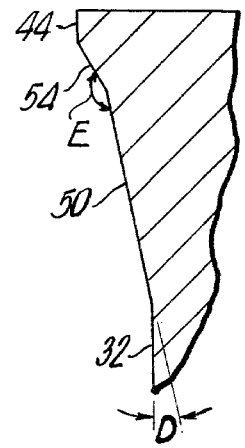
FIG.5
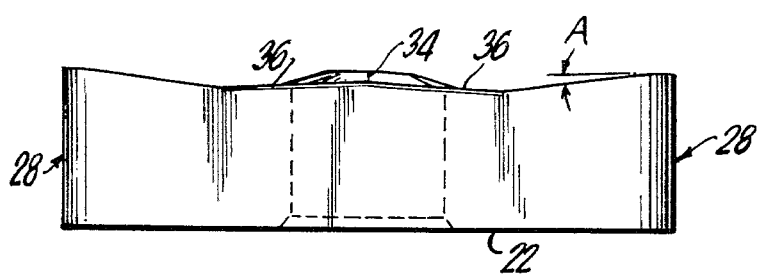
FIG.3

CUTTING INSERT WITH IMPROVED CHIP CONTROL

BACKGROUND OF THE INVENTION

The present invention relates to cutting tools which are typically used in metal working applications such as turning lathes, milling machines, turret lathes, and similar machine tools. More particularly, the present invention relates to a new and improved cutting insert, i.e. a cutting tool or element which is fixed in the recess of a tool holder and formed with several cutting edges which can be brought successively into cutting position by adjustment of the insert relative to the recess of the tool holder. Typically, the insert is formed from a block of an abrasion resistant material, such as a cemented carbide or the like, and is fixed to the tool holder by a clamp means or pin member received through a central aperture in the insert. The insert is easily indexable by virtue of the fact that the clamp or pin member may be released and the insert rotated so as to place a new cutting edge into an operative position. In operation, a metal workpiece is selectively brought into contact with the cutting edge of the insert whereby continuous strand portions of the metal workpiece, commonly referred to as chips, are removed in order to form the desired configuration on the workpiece. An important consideration in the machining process is the control of the continuous metal strands or chips as they are being removed from the workpiece. It will be appreciated that at the high speed at which machining is done today the uncontrolled flow of the metal strands, which have sharp edges, would present a very serious safety hazard to the tool operator. In addition, if the chip flow were not controlled, it would be very likely that the chip would contact and damage the unused cutting edges of the insert, thus resulting in a shorter tool life.

Accordingly, known cutting tools typically include means for mechanically bending the snaking chip as it comes from the workpiece so as to break it into small individual chips that fall harmlessly to the floor before endangering the operator, and not interfere with the cutting edges of the insert nor the workpiece. One such means includes a member which is separate and distinct from the insert, and commonly referred to as a chip breaker. Typically, the chip braker is fixed to the tool holder and disposed directly above the insert so as to contact the chip strands as they are being removed from the workpiece, thus breaking the chip strands into smaller particles. The chip breaker also typically includes a sloped edge portion which guides the broken chips away from the cutting edge of the insert.

Another such means is actually integral with the insert itself. More particularly, the insert includes a built-in chip control groove which deflects the chips and forms the chips into an acceptable configuration. Several chip groove configurations are known and numerous attempts are continually made to improve the performance thereof.

One shortcoming of the prior art chip groove configurations is that they were of use of only limited applications. More specifically, the chip grooves and outer land areas provided on each insert were designed for particular feed rates, and particular machining depths (chip load). Therefore, it would be desirable to provide an indexable insert having a new and improved chip groove and land area configuration which enables the insert to be utilized throughout a broad range of feed rates, and under various chip loads.

In addition to feed rates and depth of cut, the indexable insert must be designed to perform in various situations wherein the power and force required in the machining application varied. As the force and power increase, temperatures also increase, which results in a higher incidence of thermal wear of the insert. Further, at higher temperatures, the chip strands themselves become more difficult to break, and the increased power tends to force the unbroken chips against the surface of the insert causing early tool failure. Therefore, it would be desirable to provide a new and improved indexable insert which is operative to reduce cutting forces in a given machining situation, thereby reducing temperatures and increasing the life of the insert.

Accordingly, it is an object of the subject invention to provide a new and improved cutting insert which includes a unique chip groove and land area configuration which may be utilized to machine cuts of various depths and at various feed rates.

It is a further object of the subject invention to provide a new and improved cutting insert including a unique chip groove configuration which provides greater chip control and reduces the force and power requirements for a given application thereby increasing metal removal rate per unit of power, and reducing temperature so as to minimize thermal wear and other heat associated problem.

It is another object of the subject invention to provide a new and improved cutting insert which includes positive back and side rake angles to further reduce force requirements thereby decreasing deflection as well as unwanted chatter and vibration, which affect the quality of machining as well as tool life.

SUMMARY OF THE INVENTION

The cutting insert of the subject invention is formed from a wafer of cutting material, preferably a cemented carbide, which is a hard, abrasion resistant metal. The cutting insert is generally polygonal in plan and includes a pair of opposed faces and a plurality of upstanding side walls extending therebetween, with the juncture between the side walls and the opposed faces defining the cutting edges of the insert. The polygonal insert which may, for example, be triangular, is provided with a plurality of radiused corner portions, the number of which being dependent upon the particular configuration of the polygonal insert. In accordance with the subject invention, at least one face of the insert is nonplanar and provided with a configuration which aids in chip control. More specifically, each corner portion of the insert slopes inwardly towards the opposed face of the insert. Further, each corner portion includes a pair of abutting, generally triangular chip grooves, separated by a raised central triangular land area. The pair of grooves are arranged in mirror image relationship and are spaced from the adjacent cutting edges to define side land areas. The central triangular land area includes a pair of side edges and a vertex and is located such that an imaginary line bisecting the vertex is disposed substantially normal to the radiused corner portion associated therewith. In addition, the side edges of the central land area are disposed at an angle relative to the adjacent cutting edges of the insert such that the width of each chip groove increases outwardly from the corner portion. Further, since the corner portions slope inwardly towards the opposed insert face, the depth of each chip groove portion increases outwardly from the corner portion. By this arrangement, and as described more fully hereinbelow, the insert may be utilized to machine cuts through a wide range of feed rates while simultaneously reducing cutting forces and temperatures thereby lengthening the insert's life. Preferably, the side land areas also vary in width, increasing outwardly from their respective corner portions, permitting the insert to be utilized with varying chip loads. The subject insert may also include a mounting means such as a central aperture for receiving a mounting pin for connecting the insert to a tool holder.

Further objects and advantages of the subject invention will become apparent with reference to the following detailed description in conjunction with the drawings in which:

BRIEF DESCRIPTION OF THE DRAWINGS

FIG. 1 is a perspective view of the new and improved cutting insert of the subject invention.

FIG. 2 is a top plan view of the cutting insert of the subject invention.

FIG. 3 is a side elevational view of the cutting insert of the subject invention.

FIG. 4 is a cross sectional view of the cutting insert of the subject invention, taken along line 4—4 of FIG. 2.

FIG. 5 is a cross sectional view of the cutting insert of the subject invention, taken along the line 5—5 of FIG. 2.

DETAILED DESCRIPTION OF THE PREFERRED EMBODIMENT

Referring to FIGS. 1-5, the cutting insert 10 of the subject invention is illustrated and is intended for use at feed rates in the range from 0.010 to 0.045 inches per revolution. The cutting insert 10 is typically formed from a wafer of hard, abrasion resistant metal, such as a cemented carbide, and is generally polygonal in plan. The insert 10 is provided with a pair of opposed faces 20 and 22 and a plurality of upstanding side walls 24 extending essentially perpendicularly therebetween. The juncture between each side wall 24 and the upper planar face 20 defines the cutting edges 26 of the insert 10. The illustrated insert 10 is shown to be triangular in configuration, having three corner portions 28 which are rounded or radiused. In a one half inch triangular insert, having a thickness of approximately 0.375 inches, the corner portions 28 are provided with a radius of 1/32 of an inch. It will be understood that while the insert 10 depicted in the figures is generally triangular in plan, the scope of the subject invention is intended to include inserts of any polygonal configuration such as square, diamond, etc. The insert 10 may be provided with a central aperture 30 for mounting the insert on a tool holder.

In accordance with the subject invention, at least one of the faces 20 is nonplanar, with the corner portions 28 sloping inwardly towards the opposed rake face 22, to a central surface area 32. The angle of the slope, seen at "A" in FIG. 3, is preferably in the range of 4° to 10°. The central surface area 32 is also nonplanar and includes a plurality of crests 34 which are defined by a pair of upwardly extending intermediate edge sections 36. Preferably, and as illustrated in FIG. 3, crest 34 is disposed closer to face 22 than the extreme points of corner portions 28. As further viewed in FIG. 3, the combination of the sloping end portions 28 and the rising crest portion 34 cooperate to define cutting edge 26 having a generally W-shaped configuration.

In accordance with the subject invention, each corner portion 28 further includes a pair of abutting, generally triangular chip grooves 40 which are separated by a generally triangular shaped land area 42. Preferably, the chip grooves 40 are disposed in mirror image relationship about central land area 42. The chip grooves 40 are spaced from the cutting edges 26 of the insert thereby defining a pair of side land areas 44 between each groove 40 and the adjacent cutting edge. Preferably, the width of the side land areas 44 increases outwardly from the tip of the corner portion 28. As more fully described hereinafter, the varying width of the side land areas 44 enables the subject insert 10 to handle a range of chip loads.

Central land area 42 includes a vertex 46 and a pair of opposed side edges 48. Preferably, the central land area 42 is located such that an imaginary line bisecting the vertex 46 is disposed normal to the associated radiused corner portion 28. Further, the side edges 48 of the central land area 42 are disposed at an angle relative to the cutting edges 26, of the insert. By this arrangement and as illustrated in FIG. 2, the width of the chip grooves 40 increase from the corner portion 28 outwardly. As discussed more fully hereinbelow, the varying width of the chip grooves 40 enables the insert to handle a broad range of feed rates by reducing cutting forces.

In the first embodiment of the subject invention, the central land area 42 is essentially prism shaped and includes a central ridge 50 and sloping side walls 52 terminating in edges 48. As viewed in FIG. 4, at "B", the slope of the side walls 52 relative to the plane of the insert is in the range of 20° to 30° and is preferably 25°. The angle "C", between the side walls 52 of ridge 50 and the associated chip groove 40 should fall within 120° to 160°. As illustrated in FIG. 5 at "D", ridge 50 slopes inwardly towards the opposed face 22 of the insert from the vertex 46 to the opposed end at an angle between 5° to 15° and preferably 10°, relative to central area 32. The vertex 46 of the central land area 42 is spaced from the tip of the corner portion 28 such that a common chip groove area 54 is defined joining the opposed chip grooves 40. The common area 54 also slopes towards the opposed insert face 22, from the corner portion 28 to its opposed end. The angle "E" between common area 54 and ridge 50 is between 160° and 175°. Common area 54 enables chips to flow more readily into chip groove 40.

In accordance with the subject invention and as noted above, the subject insert can be readily used in machining operations where different workpiece feed rates are required. More particularly, as the workpiece feed rate is increased for a given chip groove width, so does the tightness of the curl of the chip being removed from the workpiece. In practice, it has been found that as the tightness of the chip curl increases, so does the force exerted on the insert, thus resulting in greater wear thereby shortening the life of the insert. By providing a chip groove of varying width, a desired increase in feed rate can readily be accommodated by using a portion of the cutting edge 26 that is aligned with a wider portion of the chip groove 40. More specifically, the width of each chip groove 40 increases in width from the radiused corner portions 28 to its opposed ends. Accordingly, the portion of the cutting edge 26 which is in contact with the rotating workpiece can be adjusted such that an optimum chip groove width is attained, corresponding to the intended feed rate. By this arrangement, the tightness of the chip curl can be regulated such that less force will be exerted on the insert which reduces temperatures as well as lengthening the lift of the insert.

The subject invention can further be used to machine cuts of varying depths or chip loads. More particularly, as the desired depth of the cut (chip load) to be effected is increased, the support for the cutting edge 26 of the insert must be increased. The support for the cutting edge is provided by the side land areas 44. Since the width of each side land area 44 increases, by selectively placing the workpiece against that portion of a side land area having the desired width, sufficient support for the cutting edge can be provided for each particular machining situation. Thus, where a relatively shallow depth of cut is desired, the portion of the cutting edge 26 adjacent the corner portion 28, where the side land area 44 is the narrowest, can be utilized. In the alternative, where a greater depth of cut is desired, a portion of the cutting edge 26 further from the corner portion 28, where the side land area 44 is wider thereby providing increased support, can be utilized.

It will also be noted that each chip groove 40 slopes inwardly towards the opposed insert face 22 from the radiused corner portion 28 to its opposed end. This arrangement wherein the depth of the chip grooves increases, also functions to reduce the forces exerted by the chips on the insert, in a given machining operation, thereby reducing temperatures and extending the life of the insert. Preferably, insert 10 is provided with positive back and side rake angles which reduce deflection as well as unwanted chatter and vibration.

In order to better describe the present invention, reference is made to results obtained when an insert configured in accordance with the subject invention was contrasted with a standard insert having a known chip groove configuration. More particularly, an insert 10 constructed in accordance with the subject invention (A) and a known insert (B) were used in identical machining operations consisting of machining AISI 1045 steel having a Brinell hardness of 200 BHN, at a speed of 400 surface feet per minute, depth of cut of 0.200 inches, and at a side cutting edge angle of 15°. Each insert was formed from the same grade cemented carbide and tested at feed rates of 0.016 inches per revolution and 0.047 inches per revolution. The results of the tests are indicated in the following table:

TABLE

| | (A) | | | | (B) | |
|---|---|---|---|---|---|---|
| Feed Rate | .016 | Force Reduction | .047 | Force Reduction | .016 | .047 |
| Tangential Force (lb/) | 810 | 13% | 2100 | 11% | 925 | 2350 |
| Longitudinal Force (lb/) | 320 | 20% | 480 | 44% | 400 | 850 |
| Radial Force (lb/) | 160 | 40% | 280 | 53% | 265 | 595 |

Regarding the above test results the forces measured were those acting on the insert, and it is noted that the forces on the workpiece are equal but in the opposite direction. The tangential force measured is related to cutting speed at which the insert is used; the longitudinal force is related to the rate at which the workpiece is fed to the insert; and the radial force is related to the depth of cut made by the insert into the workpiece. It is apparent that significant reductions in force are achieved with an insert configured in accordance with the subject invention, whereby insert life can be substantially increased.

In summary, the subject invention provides for a new and improved cutting insert having a unique chip groove configuration. More particularly, an insert having a polygonal configuration includes at least one nonplanar face having a plurality of corner portions which slope inwardly towards the opposed face of the insert. Each corner portion includes a pair of abutting generally triangular chip grooves separated by a central triangular land area. Each of the chip grooves are spaced from the adjacent cutting edge of the insert to define side land areas. The triangular central land area includes a vertex and a pair of side edges, and is located such that an imaginary line bisecting the vertex is disposed substantially normal to the corner portions of the insert. The side edges of the central land area are disposed at an angle relative to the adjacent cutting edges such that the width of each chip groove increases from its end adjacent the corner portion to its opposed end. This unique chip groove configuration results in a significant reduction in the forces to which the insert is subjected to during a given application. This reduction of forces also affects a reduction in operating temperature, with that reduction resulting in the lengthening of the insert life.

While there have been described herein what is at present considered a preferred embodiment of the invention, it will be obvious to those skilled in the art that many modifications and changes may be made therein without departing from the essence of the invention. It is therefore to be understood that the exemplary embodiment is illustrative and not restrictive of the invention, the scope of which is defined in the appended claims, and that all modifications that come within the meaning and range of equivalency of the claims are intended to be included therein.

We claim:

1. A cutting insert for use with an indexable cutting tool comprising:

a flat wafer of cutting material of generally polygonal plan form, having a pair of opposed faces and a plurality of upstanding side walls extending therebetween with the juncture between each said side wall and a face defining a peripheral cutting edge, said polygonal wafer further including a plurality of radiused corner portions with at least one of said insert faces being nonplanar with the corner portions thereof sloping inwardly towards the opposed face to a central surface on said nonplanar face, each of said corner portions of said nonplanar face including a pair of abutting, generally triangular chip groove portions and a raised central triangular land area disposed between each pair of abutting chip groove portions, each chip groove portions being spaced from the adjacent cutting edge of the insert so as to define a side land area, each said central land area including a pair of side edges and a vertex, with an imaginary line bisecting said vertex being disposed substantially normal to the radiused corner portion associated therewith, and with said side edges of each said triangular land area being disposed at an angle relative to the adjacent cutting edges of the insert such that the width of each said chip groove portion increases from its end adjacent its respective corner portion to its opposed end, and with the depth of each chip groove portion increasing from its end adjacent its respective corner portion to its opposed end whereby said insert may be utilized to machine cuts through a range of feed rates while simultaneously reducing cutting forces.

2. A cutting insert as recited in claim 1 wherein each said side land area increases in width from its end adjacent the associated corner portion to its opposed end.

3. A cutting insert as recited in claim 1 wherein said triangular central land area is spaced from its associated corner portion so as to define a common land area between the associated pair of abutting groove portions disposed on either side of said central land area, said common groove area sloping towards said opposed insert face, from said corner portion to said central land area.

4. A cutting insert as recited in claim 1 wherein said central land area is generally prism-like in configuration.

5. A cutting insert as recited in claim 1 further including a central aperture for receiving a mounting pin.

6. A cutting insert as recited in claim 1 wherein said chip groove portions in each pair of chip groove portions are in mirror image relationship with one another.

7. A cutting insert as recited in claim 1 wherein said sloping corner portions are disposed, relative to said opposed face, at angle between 4° and 10°.

8. A cutting insert as recited in claim 1 which is substantially triangular in configuration.

9. A cutting insert as recited in claim 1 wherein each peripheral cutting edge adjacent said one face is generally W-shaped in configuration with the distal ends thereof sloping inwardly from their respective corner portions and towards the opposed insert face, and with a pair of intermediate edge portions extending from the distal ends outwardly of the insert to each other to form a crest portion, said crest portion being disposed at a level closer to the opposed insert face than the distal ends of the associated cutting edge portions.

10. A cutting insert for use with an indexable cutting tool comprising:

a flat wafer of cutting material of generally polygonal plan form, having a pair of opposed faces and a plurality of upstanding side walls extending therebetween with the juncture between each said side wall and face defining a peripheral cutting edge, said polygonal wafer further including a plurality of corner portions with at least one of said insert faces being nonplanar with the corner portions thereof sloping inwardly and towards the opposed face to a central surface on said nonplanar face, each of said corner portions of said non-planar face including a pair of abutting generally triangular chip groove portions and a raised central triangular land area disposed between each pair of abutting chip groove portions, said chip groove portions in each abutting pair of chip groove portions being substantially in mirror image relationship with one another, each chip groove portion being spaced from the adjacent cutting edge of the insert so as to define a side land area, each said side land area increasing in width along its length from the associated corner portion to the opposed end thereof, and with each said central land area being spaced from its respective corner portion so as to define a common area forming a part of both of the abutting groove portions disposed on either side of said central land area, each said central land area including a pair of sloping side edges and a vertex, said central land area increasing in height from its vertex adjacent its respective corner portion to its opposed end, and with an imaginary line bisecting said vertex being disposed substantially normal to the radiused corner portion associated therewith, with said sloping side edges of each said triangular land portion being disposed at and angle relative to the adjacent cutting edges of the insert, such that the width of each said chip groove portion increases from its end adjacent its respective corner portion to its opposed end, and with the depth of each said chip groove portion increasing from its end adjacent its respective corner portion to its opposed end, and with each cutting edge adjacent said one face of said insert being generally W-shaped in configuration, with the distal ends thereof sloping inwardly from their respective corner portions and towards the opposed insert face, and with a pair of intermediate edge portions extending from the distal ends outwardly from the opposed insert face to form a crest portion, said crest portion being disposed at a level closer to the opposed insert face then the distal ends of the associated cutting edge.

* * * * *